E. HEGENBERG NÉE FREYER.
LID HOLDER WITH DROP CATCHER.
APPLICATION FILED NOV. 7, 1921.

1,438,706.

Patented Dec. 12, 1922.

Patented Dec. 12, 1922.

1,438,706

UNITED STATES PATENT OFFICE.

ERNA HEGENBERG, NÉE FREYER, OF BERLIN, GERMANY.

LID HOLDER WITH DROP CATCHER.

Application filed November 7, 1921. Serial No. 513,556.

*To all whom it may concern:*

Be it known that I, ERNA HEGENBERG, née FREYER, a citizen of the German Republic, residing at Berlin, Germany, have invented certain new and useful Improvements in Lid Holders with Drop Catchers, of which the following is a specification.

When pots with spouts or similar receptacles are used, such as for instance tea pots or coffee pots, drops collect at the mouth of the spout when the liquid is being poured out, said drops soiling the tablecloth when they drop off.

This invention relates to a device for intercepting such collecting drops and for holding at the same time the lid so that it does not drop off when the pot is brought into an inclined position.

The drop catcher can be used also in connection with vessels which have no spout in which case the device is placed around the body of the vessel so that the drop-absorbing felt stands perpendicularly under the outflow opening.

The device consists of a wire spiral of circular, oval or flat cross section which at the ends can have a hook and eye or similar connection, which is closed in form of a ring or has only a hook at one end designed to be hooked upon the handle of the coffee pot. A tubular piece of felt or of other convenient absorbing material is placed upon the wire spiral. A runner serves for securing the device in its position.

In order that the invention may be clearly understood, I shall proceed to describe the same with reference to the forms of construction shown by way of example in the accompanying drawing, wherein:—

Figure 1:
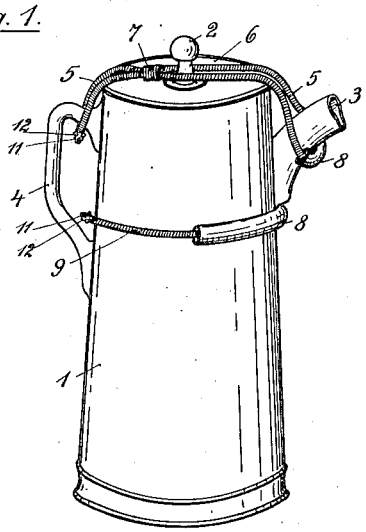
Fig. 1 shows a coffee pot with the device in two positions.
Figure 3:
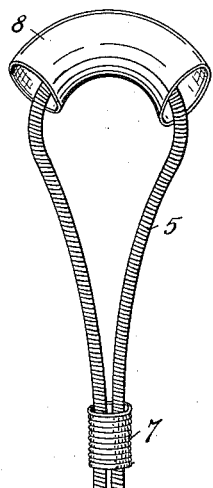
Fig. 3 shows the lid holder with the drop catcher.
Figure 2:
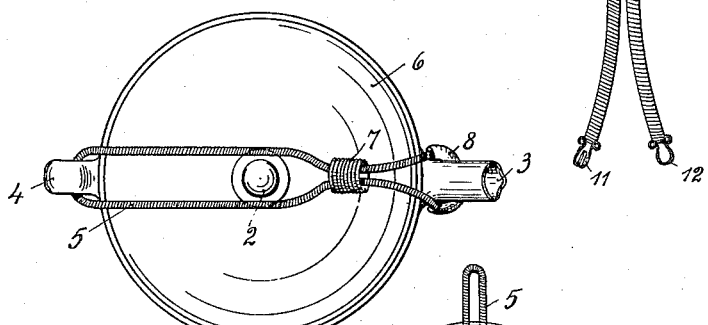
Fig. 2 is a plan view of Fig. 1, the runner being situated between the knob of the lid and the spout instead of between knob and handle as shown on Fig. 1.

The wire spiral 5 has a hook 11 at the one end and an eye 12 at the other end so that it can be closed after having been placed around the spout 3 of a pot 1, conducted across the lid 6 of the pot, at the right and left of the knob 2, to the handle 4. Owing to the elasticity of the wire spiral the device will adapt itself to pots of any size. The tubular felt piece 8 which is designed to catch and to absorb the drops is movably arranged upon the wire spiral 5 so that it can be placed in the proper position under the spout. A runner 7 serves to secure the device in its position. The device is shown on Fig. 1 at 9 as placed around the body of the pot. The device is used in this manner in connection with pots without spout.

Figure 4:
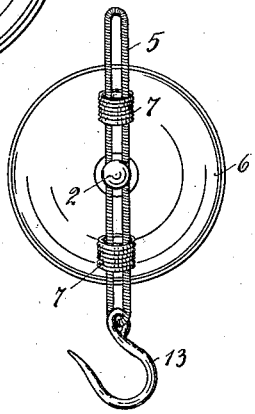
Fig. 4 shows in plan view a lid with a lid holder and drop catcher of modified construction.

The device as shown on Fig. 4 has two runners 7, 7 and a hook 13 at one end which is designed to be hooked over the handle of a pot.

I claim:—

1. A lid holder with drop catcher comprising in combination a wire spiral of convenient cross section, means for connecting the free ends of the spiral, and a tubular piece of absorbent material placed upon said wire spiral so that it can be brought into the proper position for catching and absorbing the drops which drop off the outlet of the vessel in connection with the device used.

2. A lid holder with drop catcher comprising in combination a wire spiral of convenient cross section, means for connecting the free ends of the spiral, a tubular piece of absorbent material placed upon said wire spiral so that it can be brought into the proper position for catching and absorbing the drops which drop off the outlet of the vessel in connection with the device used, and a runner for securing the lid holder in its position.

In testimony whereof I affix my signature in presence of two witnesses.

ERNA HEGENBERG, GEB. FREYER.

Witnesses:
ARTHUR PARKENBERG,
OMER NIEM.